United States Patent Office 3,509,243
Patented Apr. 28, 1970

3,509,243
EXPLOSIVE COMPOSITION CONTAINING A MIXTURE OF STARCH RUBBER VINYL CHLORIDE COPOLYMER AS BINDER AND METHOD OF MAKING SAME
David Pelton Moore, Marlow, N.H.
(11724 Lovejoy St., Silver Spring, Md. 20902)
No Drawing. Filed Mar. 7, 1969, Ser. No. 805,350
Int. Cl. C06b 21/02
U.S. Cl. 264—3     2 Claims

ABSTRACT OF THE DISCLOSURE

This explosive consists of any of the alkali salt oxidants, or mixtures thereof with a binder composed of an aqueous dispersion of an ignitable burnable adhesive, which is composed of a mixture of an aqueous dispersion of rubber and a vinyl chloride copolymer in varying proportions with a starch. The oxidant may be mixed with the adhesive as a dry powder or wetted to flow. This combination is then heated to from 75° to 85° centigrade, preferably 80° centigrade to swell the starch particles and make a workable putty or dough like mass to then receive the oxidant to produce a solid propellent and explosives in sheet, strip or particle form.

My present invention relates to improvements in explosives and the methods of making same, and one object of the invention is to provide a method of mixing an explosive composition with safety. The explosive while being mixed is never in dry form and the temperature is never above 85° centigrade. The alkali salts are be selected from the group of consisting of aluminum nitrate, aluminum chlorate, aluminum perchlorate, ammonium nitrate, ammonium chlorate, ammonium perchlorate, potassium nitrate, potassium chlorate, potassium perchlorate, sodium nitrate and sodium chlorate.

In mixing the explosive composition, the adhesive may range from 50 to 90% of the copolymer and from 50 to 10% of the latex, and starch varying from 7 to 20%. The adhesive ranges from 4.09 to 12% solids. This mixture with the starch in dry powdered form or wetted to be dough-like or slightly pourable, is then heated to 75 to 85° centigrade, preferably 85 degrees centigrade until the starch particles swell and absorb nearly all of the water in the adhesive, thus producing a workable putty or dough-like form. This mixture can be shaped into a solid propellent in the form of sheets, strips, or particles, depending upon the use, such as a substitute for other well known explosives, as for instance dynamite, TNT and black powder.

EXAMPLE NO. 1

|  | Percent by wt. |
|---|---|
| The selected oxidant | 60–90 |
| Binder | 12–25 |

EXAMPLE NO. 2

|  | Percent by wt. |
|---|---|
| Sodium nitrate | 40–60 |
| Sulfur | 20–40 |
| Binder as in No. 1. |  |

This is a substitute for black powder, and is a smokeless powder.

From the foregoing it will be evident that here is an explosive mixture that is safe to make, since the ingredients are mixed with a water contained binder, and the heat used is never above 85° centigrade, which permits an immediate introduction of the selected oxidant as soon as the starch is swollen.

What I claim, as new, is:

1. The method of making an explosive comprising intimately mixing together an inorganic oxidizer salt selected from the group consisting of aluminum nitrate, aluminum chlorate, aluminum perchlorate, ammonium nitrate, ammonium chlorate, ammonium perchlorate, potassium nitrate, potassium chlorate, potassium perchlorate, sodium nitrate, and sodium chlorate, and a binder composed of an aqueous dispersion of a burnable ignitable adhesive, composed of a vinyl chloride copolymer 90 to 50% by volume and an aqueous dispersion of rubber 50 to 10% by volume, and starch 7 to 20% by weight, heating said oxidizer and binder to from 75 to 85 degrees centigrade to swell the starch particles and cause them to absorb the quantity of water of the adhesive, shaping the mixture, and drying shaped mixture.

2. An explosive made in accordance with the method set forth in claim 1.

References Cited
UNITED STATES PATENTS

Re. 26,108  6/1964  Moore _____ 149—19
3,409,708  11/1968  Moore _____ 264—3

S. J. LECHERT, Assistant Examiner

U.S. Cl. X.R.
149—18, 19, 20, 45, 46, 60, 61, 75, 76, 83